United States Patent [19]

Robinson et al.

[11] Patent Number: 4,679,153
[45] Date of Patent: Jul. 7, 1987

[54] PRINTING SYSTEMS FOR TYPESETTER EMULATION

[75] Inventors: John S. Robinson, La Grange Park; Thomas E. Ahlswede, Chicago; Charles A. Cornelius, Evanston, all of Ill.

[73] Assignee: R. R. Donnelley & Sons Company, Chicago, Ill.

[21] Appl. No.: 727,895

[22] Filed: Apr. 26, 1985

[51] Int. Cl.⁴ .................... G03B 15/00; B41B 17/00
[52] U.S. Cl. .................................. 364/523; 354/7
[58] Field of Search ............... 364/523; 354/5, 6, 7; 355/41, 54

[56] References Cited

U.S. PATENT DOCUMENTS

| Re. 29,864 | 12/1978 | Szabo | 355/41 |
| 3,905,699 | 9/1975 | Szabo | 355/54 |
| 4,231,096 | 10/1980 | Hansen et al. | 354/7 |

Primary Examiner—Russell E. Adams
Attorney, Agent, or Firm—Wood, Dalton, Phillips, Mason & Rowe

[57] ABSTRACT

A printing system and method is disclosed herein which is capable of emulating any of a plurality of phototypesetters to create a proof comprising at least one glyph on a reproduction medium from composition data. The proof is created from page and font data encoded in any of a plurality of formats, such data including an identification of the particular format in which the data is encoded. The system processes the font data and page data a first time in accordance with the identification to derive an encoded representation of the glyph to be reproduced. The system processes the page data a second time in accordance with the identification to derive character and typesetting commands which together define the placement of the glyph on the reproduction medium. An output device is controlled by the system in accordance with the encoded glyph representation and the character and typesetting commands to create the proof on the reproduction medium. The system is capable of emulating any one of a plurality of phototypesetters and can reproduce proofs on inexpensive medium, such as plain paper.

31 Claims, 8 Drawing Figures

PRINTING SYSTEMS FOR TYPESETTER EMULATION

DESCRIPTION

1. Technical Field

The present invention relates to a system for producing proofs for use in the printing industry and more particularly to a system for creating plain paper proofs from data generated by any of a plurality of composition systems.

2. Background Art

Composition systems have long been used to compose pages for printing. Such systems allow an operator to control the placement and appearance of text and other images to be printed. Composition systems create page information representing the image of the page to be printed. This information as well as font information describing a particular font are typically utilized by a phototypesetting machine to produce the image on a sheet of light sensitive media, which may then be used to produce a printing surface such as a plate or cylinder.

Prior to production of the printing plate, a likeness of the image, or proof, is often produced so that the image may be reviewed for accuracy. Typically, the proof is produced on film (whether RC photographic paper or transparent polyester material) by a phototypesetting machine.

However, the cost of producing a proof on film in such a manner is quite high since an operator skilled in the use of phototypesetting equipment is required as is a darkroom and special photographic material and chemicals. Further increasing this cost is the fact that many proofs of a particular page may be required before the page and font information are used for production of a printing surface.

Additionally, there are several types of phototypesetting machines, such as the Autologic APS 4 and 5 (APS) manufactured by Autologic, Inc., Newbury Park, Calif., and the Videocomp 500 (Videocomp) manufactured by Information International Inc., Culver City, Calif. (I.I.I.). Each of these phototypesetting machine types utilizes one or more page formats for encoding the page and font information. Hence, for example, information encoded in a format utilized by APS phototypesetting machines cannot be used to create proofs using Videocomp phototypesetting machines, and vice versa.

Proof production systems have also been designed for creating proofs from page and font information on inexpensive materials, such as plain paper. This, in turn, reduces production costs since film proofs need not be produced. However, composition systems generate information intended for use with high resolution output devices. Systems which create proofs on plain paper typically utilize low resolution output devices which cannot directly use the composition system output. Therefore, the composition system output must be converted into a form which is utilizable by the low resolution output device. Such conversion, however, is not exact and leads to an accumulation of errors which causes incorrect placement of images on the proof.

Also, such proof production systems are responsive to only one data format. Therefore, multiple systems are required to create proofs from information encoded in different formats.

SUMMARY OF THE INVENTION

In accordance with the present invention, a printing system capable of emulating a plurality of phototypesetting machines produces plain paper proofs using composition data encoded in any of a plurality of data formats. The system includes a preprocessor which receives the composition data, an image processor coupled to the preprocesor and an output device coupled to the image processor for creating a proof on a reproduction medium. The output device may be, for example, a laser printer which creates proofs on plain paper.

More specifically, the system of the present invention creates a proof which includes at least one glyph reproduced on the reproduction medium from page and font data encoded in any of a plurality of formats, such data including an identification of the particular format in which the data is encoded. The preprocessor processes the font and page data a first time in accordance with the identification to derive an encoded representation of the glyph to be reproduced. The encoded representation, in the form of a bit-map, is stored in the image processor. The page data is then processed a second time in accordance with the identification to derive character and typesetting commands which together define the placement of the glyph on the reproduction medium. The output device is then controlled in accordance with the encoded glyph representation and the character and typesetting commands to create the proof on the reproduction medium.

The system of the present invention is referred to as a "phototypesetter emulator" since it is capable of emulating any one of a plurality of phototypesetters. This, coupled with the capability of reproducing proofs inexpensive materials, leads to a substantial reduction in page production costs.

Further cost savings may be realized by the system of the present invention when the preprocessor is used to drive several image processors and output devices. In such a case, the preprocessor may be disposed at a location remote from the image processors and output devices. Such a system can produce multiple proofs at different locations with savings realized in terms of the capital expenditure required to create proofs.

BRIEF DESCRIPTION OF THE DRAWINGS

Other features and advantages of the invention will be apparent from the following description taken in connection with the drawings wherein.

DEFINITIONS

As used herein, the following definitions apply:

"Character" is a single graphic entity such as an alphanumeric representation, fraction, logo or equivalent thereof. A character is a single element of a font, as the term font is described below.

"Font" encompasses all characters having a common typeface style regardless of size and set width (within specified ranges), obliquity and rotation. Each character of a font is described as a plurality of adjacent columns, wherein each column includes one or more stroking segments which may be either black or white. A font may also include logos.

A "Glyph" is a single graphic entity having a specific style, size, set width, obliquity and rotation. "Glyphs" are what is actually printed on the reproduction medium.

A "Family" is a set of glyphs.

"Font data" describes the characters of a particular font in terms of the stroking segments in the adjacent columns thereof. Font data comprises the font information used by conventional typesetters merged with data identifying the format in which the data is encoded.

"Page data" describes the images to be printed, including text and graphics, encoded in any data format. Page data comprises the page information created by a composition system merged with data identifying the format in which the data is encoded and the parameters of a "page job", as defined below.

"Composition Data" is the input to the system of the present invention and includes page data and font data.

"Job" is a series of operational tasks undertaken by the system of the present invention which result in either the creation of one or more copies of a proof (or "page job") or the loading of font data into the preprocessor of the instant invention (or "font load job").

BEST MODE FOR CARRYING OUT THE INVENTION

Figure 1:
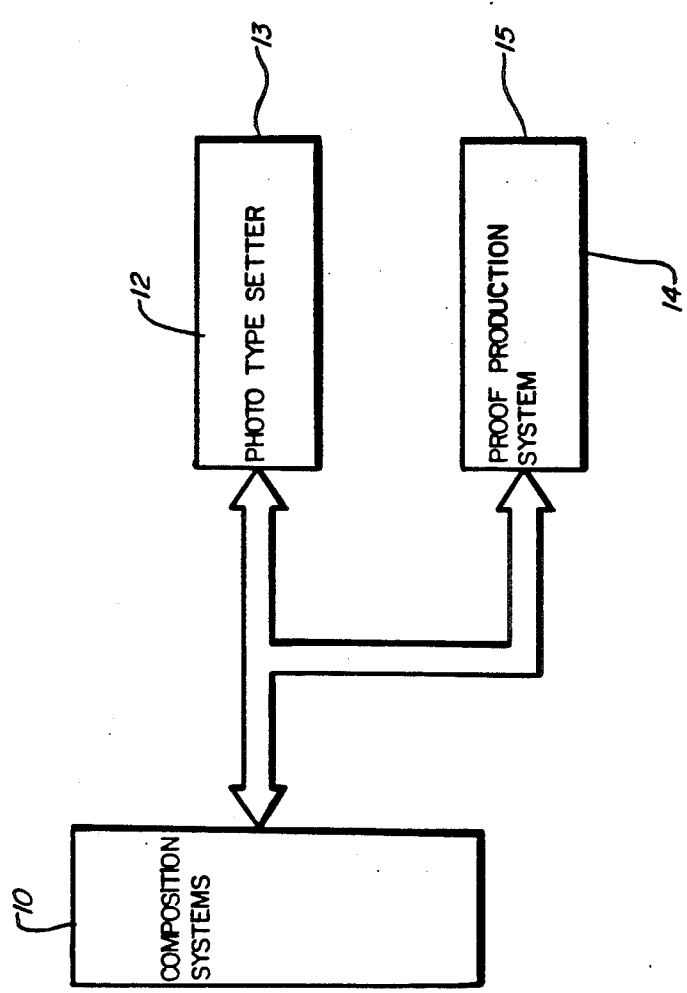
FIG. 1 is a block diagram illustrating a prior art system for creating a proof on film or paper.

Referring now to FIG. 1, there is illustrated a prior art system for creating proofs. A composition system 10, which may be one of the several types, is used to generate page information which may be used to create the proofs. The composition system 10 is coupled to a phototypesetting machine 12 or phototypesetter, which may be for example, either an APS 4 or 5 or a Videocomp 500 machine.

The phototypesetting machine 12 produces a proof 13 on a light sensitive medium in response to the page information generated by the composition system 10. The composition system 10 must create page information in a data format compatible with the particular phototypesetting machine being used. For example, an Autologic phototypesetting machine requires page information in a format referred to as APS4 ICL or APS5 ICL. On the other hand a III phototypesetting machine may require page information in a format known as 500 BIL.

The composition system may alternatively be coupled to a proof production system 14 which creates a proof 15 on inexpensive material, such as plain paper. However, such proof production systems are capable of producing proofs only in response to a single page information format.

Therefore, conventional phototypesetters and proof production systems lack the capability of producing a proof on plain paper in response to information encoded in other than a single data format.

Figure 2:
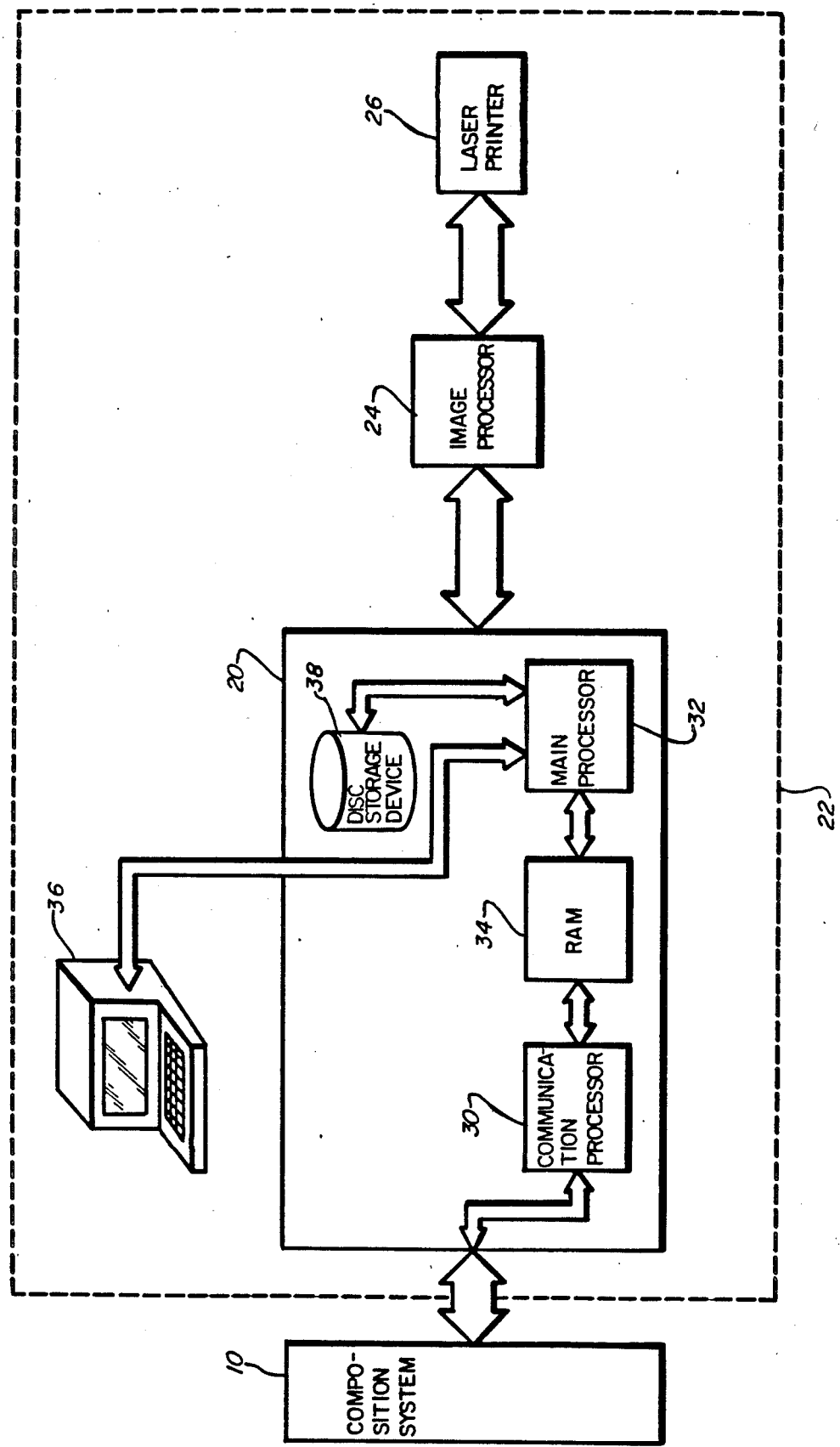
FIG. 2 is a diagram of the printing system of the present invention.

Referring now to FIG. 2, a printing system according to the present invention emulates a plurality of phototypesetting machines. The printing system includes a preprocessor 20, an image processor 24 coupled to the preprocessor 20 and an output device, such as a laser printer 26, coupled to and controlled by the image processor 24.

The image processor 24 and the laser printer 26 may be, for example, commercially available devices sold by Imagen Corporation of Santa Clara, Calif. and Canon USA, Inc. of Lake Success, N.Y., respectively.

The preprocessor 20 includes a communications processor 30, a main processor 32 and a random access memory, or RAM, 34 coupled to the processors 30,32. Also coupled to the main processor 32 is a video display terminal, or VDT, 36 and a disk storage device 38.

The communications processor 30 receives composition data including page data and font data which may be configured in one of several formats from the composition system 10 and stores the composition data in the RAM 34. The stored composition data is thereafter accessed by the main processor 32, as noted more specifically below.

Part of the RAM 34 is dual ported, which allows the communications processor 30 to operate independently of the main processor 32. This enables faster operation of the system.

The VDT 36 permits an operator to monitor and to enter commands, as discussed further below.

As previously noted, composition data supplied by the composition system 10 includes page data and font data. Page data is configured as a series of blocks of data A, B and C while font data is configured as a series of blocks of data, D, E and F. Each block comprises a sequence of bytes. Generally, the font data is loaded onto the disk storage device 38 in the preprocessor 20 before a page job is run.

Page data block A includes page identification information, number of proofs required, priority of the job in relation to other jobs, proof paper size and an identification of the specific data format of the page information, for example APS or Videocomp format.

Page data block B comprises character commands and typesetting commands which together define the placement of glyphs on the proof. This data block includes the page information generated by a composition system, as noted more specifically below. A character command identifies a particular glyph while a typesetting command includes such instructions as location of the glyph on the page, page advance, carriage return, tab and begin/end underline.

Page data block C is an end of page block, indicating that all data for the particular page job has been transmitted.

Font data block D identifies the particular font to be stored on the disk 38 and the data format in which the font data is encoded. For example, Autologic font data may be provided in a format referred to as "nibble" format while III font data may be provided in a format referred to as "V-bit" format.

Font data block E comprises data describing an entire font to be stored on the disk 38 and includes the font information, as described more specifically below.

Font data block F indicates that the data describing the entire font has been transmitted.

It should be noted composition data, as utilized by the present invention, is not the standard output of a typical composition system which includes page information and font information. Rather, job control language (or JCL) data, is merged with the page information and font information to form the page data and the font data which are utilized by the present invention.

Specifically, the entire page data block A', the two leading bytes of the page data block B identifying the block and the length thereof and the entire page data block C are merged with the page information to form the page data.

Similarly, the entire font data block D, the two leading bytes of the font data block E identifying the block and the length thereof and the entire font data block F are merged with the font information to form the font data.

Data blocks A and D are hereinafter referred to as "header blocks" for ease of reference.

Figure 3:
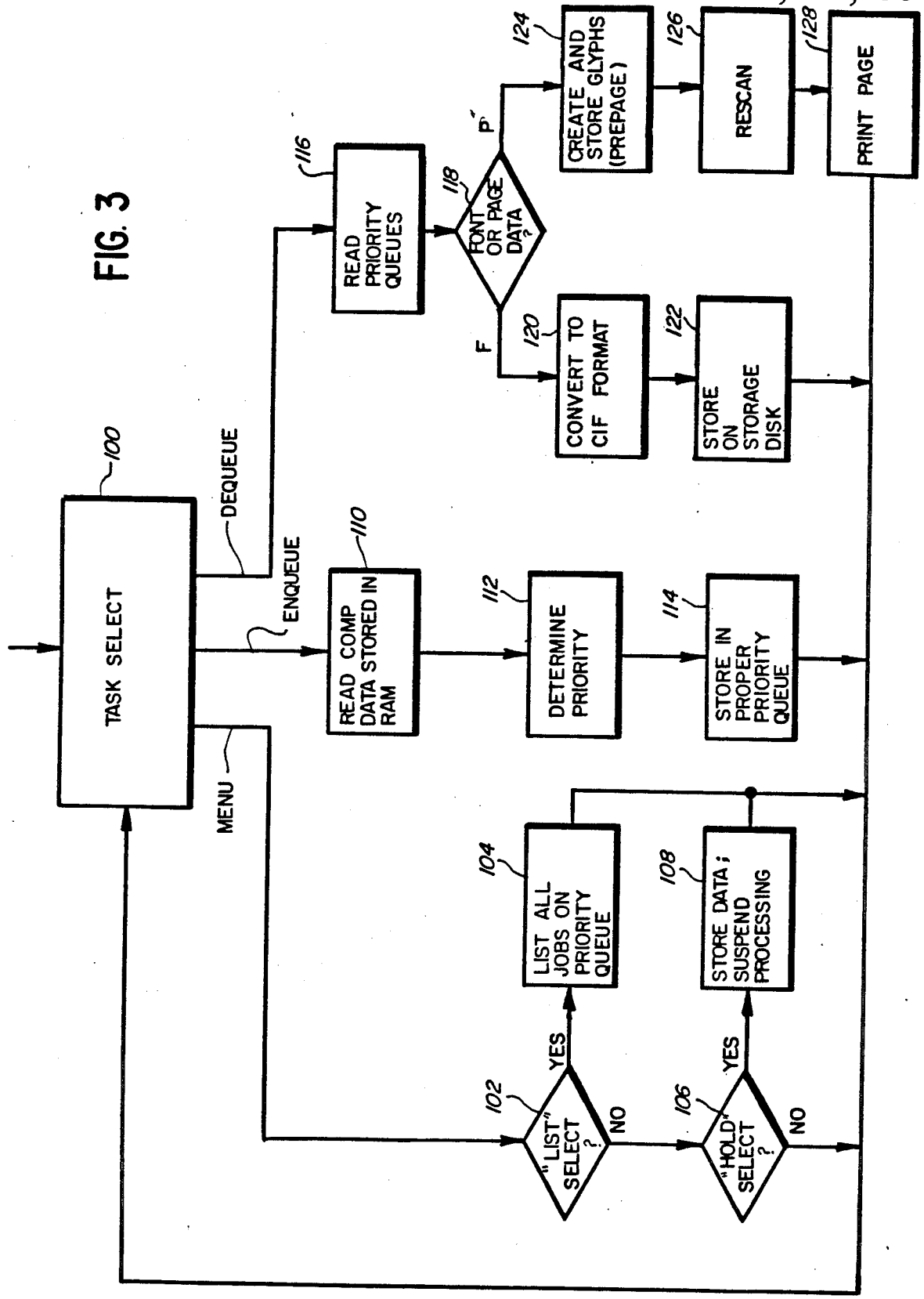
FIG. 3 is a generalized flow chart illustrating the control program stored on the disk within the preprocessor shown in block diagram form in FIG. 2.

Referring now to FIG. 3, illustrated are three principal routines which are run by the main processor 32 under control of a task select block 100. The entire program is resident on the disk storage device 38 and the steps defining the routines are written into the RAM 34 as needed.

The first routine is menu select. A menu appears on the VDT 36, displaying either of two possible operator selectable sub-routines, denoted "list" and "hold".

The list sub-routine, blocks 102, 104, allows the operator to generate a display indicating the jobs to be processed and the priority of each job. As noted more specifically below, the font data and page data defining the jobs to be processed are stored in priority queues of the disk storage device 38.

The hold sub-routine, blocks 106, 108, allows the operator to stop the operation of the preprocessor 20 while still retaining the data stored therein. The hold sub-routine is generally used to allow for system diagnostics or troubleshooting.

A second, or enqueue routine, blocks 110–114, discussed in further detail below, causes the main processor 32 to access particular composition data stored in the RAM 34, determine the priority of the accessed composition data and store the composition data in the appropriate priority queue of the disk storage device 38.

A third, or dequeue routine, also discussed in further detail below, includes a block 116 which reads the composition data stored in the priority queues, beginning with the priority queue having the highest priority, followed by the priority queues having sequentially lesser priorities.

A block 118 determines whether the composition data is font data or page data. If the composition data read from a priority queue is font data, a pair of blocks 120, 122 convert the font data which is one of a plurality of formats to a common internal format or CIF which facilitates the subsequent creation of glyphs. CIF is a format wherein each stroking segment of a column of a particular character is described by 2 bytes. This first fourteen bits thereof define the length of a stroke segment, the fifteenth bit defines whether the segment is black or white and the sixteenth bit defines whether the instant segment is the last segment of the column.

The converted font data is stored on the disk storage device 38.

If the composition data read from a priority queue is page data, a prepage sub-routine, block 124, creates encoded glyph data in the form of bit-maps defining the required glyphs and stores this glyph data in the image processor 24. A first glyph directory stored in the image processor 24 maintains a list of the glyph data stored therein. A second glyph directory is also maintained by the main processor 32 in the RAM 34. This glyph data is independent of the positioning of characters on the proof.

A postpage sub-routine, block 126, then reprocesses the page data stored in the priority queue and derives character and typesetting commands therefrom which define, for example, the positioning of glyphs on the proof, carriage returns, tabs, underlining and the like. The image processor 24 then transfers the glyph data to the laser printer 26 for creation of a proof, block 128.

Separate prepage and postpage sub-routines are utilized due to a requirement of the Imagen image processor that all glyphs must first be stored therein prior to the receipt of converted typesetting commands.

Other image processors currently available do not have this limiation, and this in no way should affect the spirit and scope of the present invention.

Figure 4:
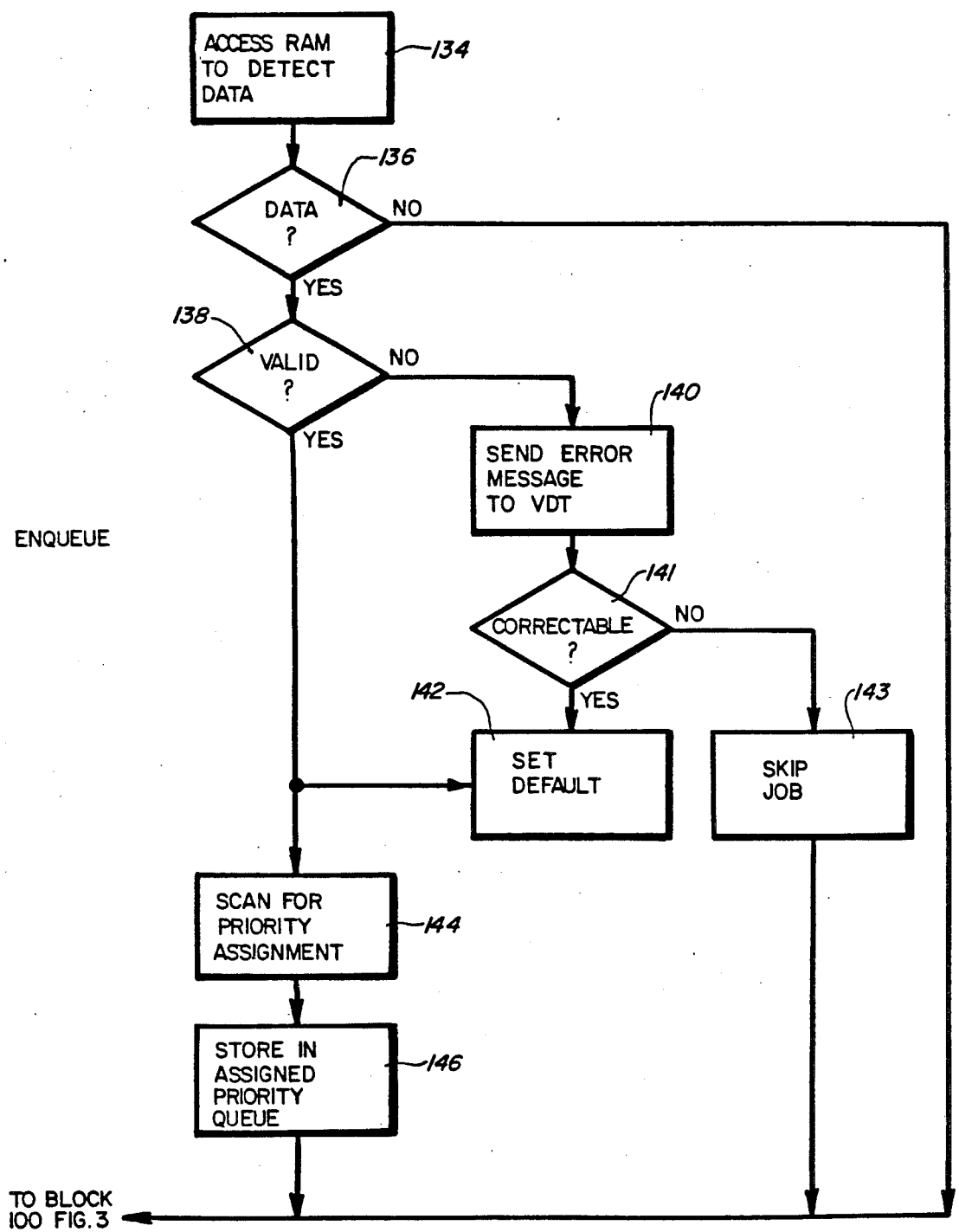
FIG. 4 is a flow chart illustrating the enqueue routine shown in FIG. 3.

Referring now to FIG. 4, there is illustrated in greater detail the enqueue routine performed by the main processor 32.

Upon initiation of the enqueue routine by the task select block 100, a block 134 accesses the RAM 34 to detect a header block of composition data. If the header block of data is not detected, indicating all composition data has already been transferred to the priority queues, control returns to the task select block 100. On the other hand, if a header block of data is detected, control passes to a block 138 which determines whether the header block contains an error. Upon detection of an error, a message so indicating is sent to the VDT 36 by a block 140 and the corresponding page or font data may be ignored for the balance of the job, depending upon whether the error detected can be corrected by a default value. Control then returns to the block 100.

Upon receipt of valid composition data, a block 144 reads the header block to determine the priority of the data. Ten priority queues are allowed by the system. Font data is automatically assigned the highest priority, priority 9, and page data can be assigned to any priority, i.e., priorities 0 through 9. Upon determination of the priority, a block 146 stores the composition data in the correct priority queue. Each priority queue handles the stored composition data on a first in, first out basis.

Following the block 146, control returns to block 100, FIG. 3.

Figure 5A:
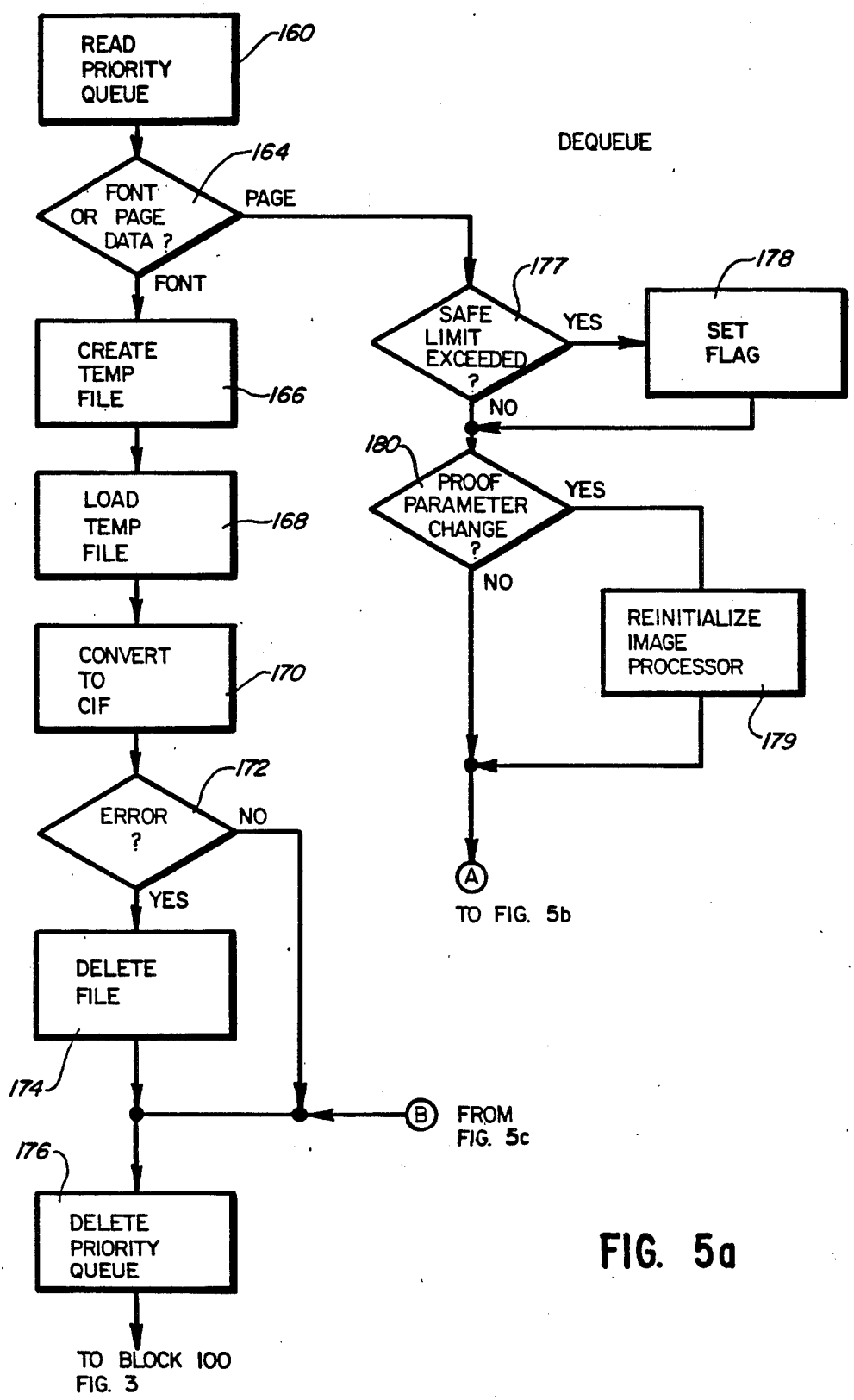
FIGS. 5a and 5b, when joined at similarly lettered lines, together comprise a flow chart illustrating the dequeue routine shown more generally in FIG. 3.
Figure 5B:
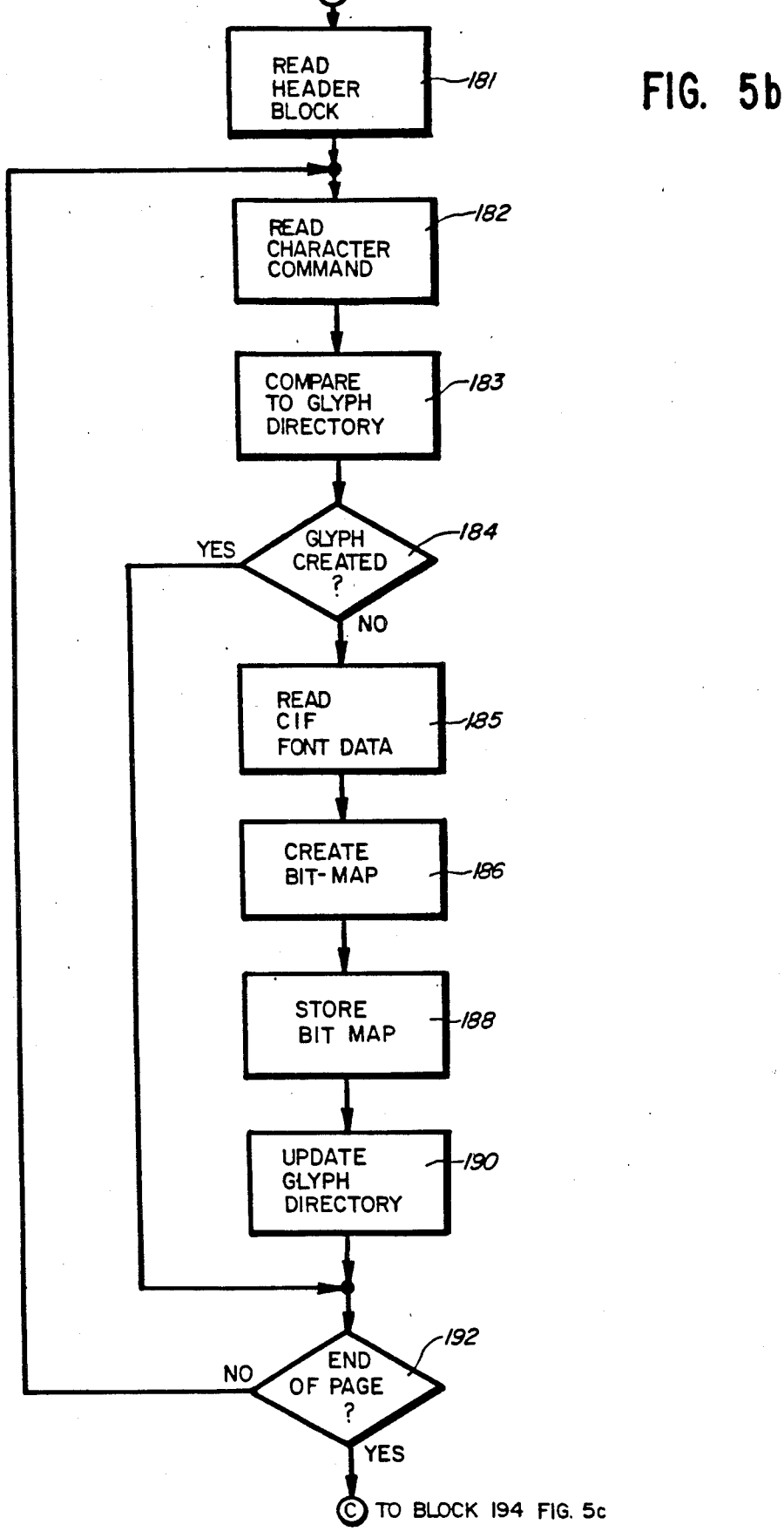
Figure 5C:
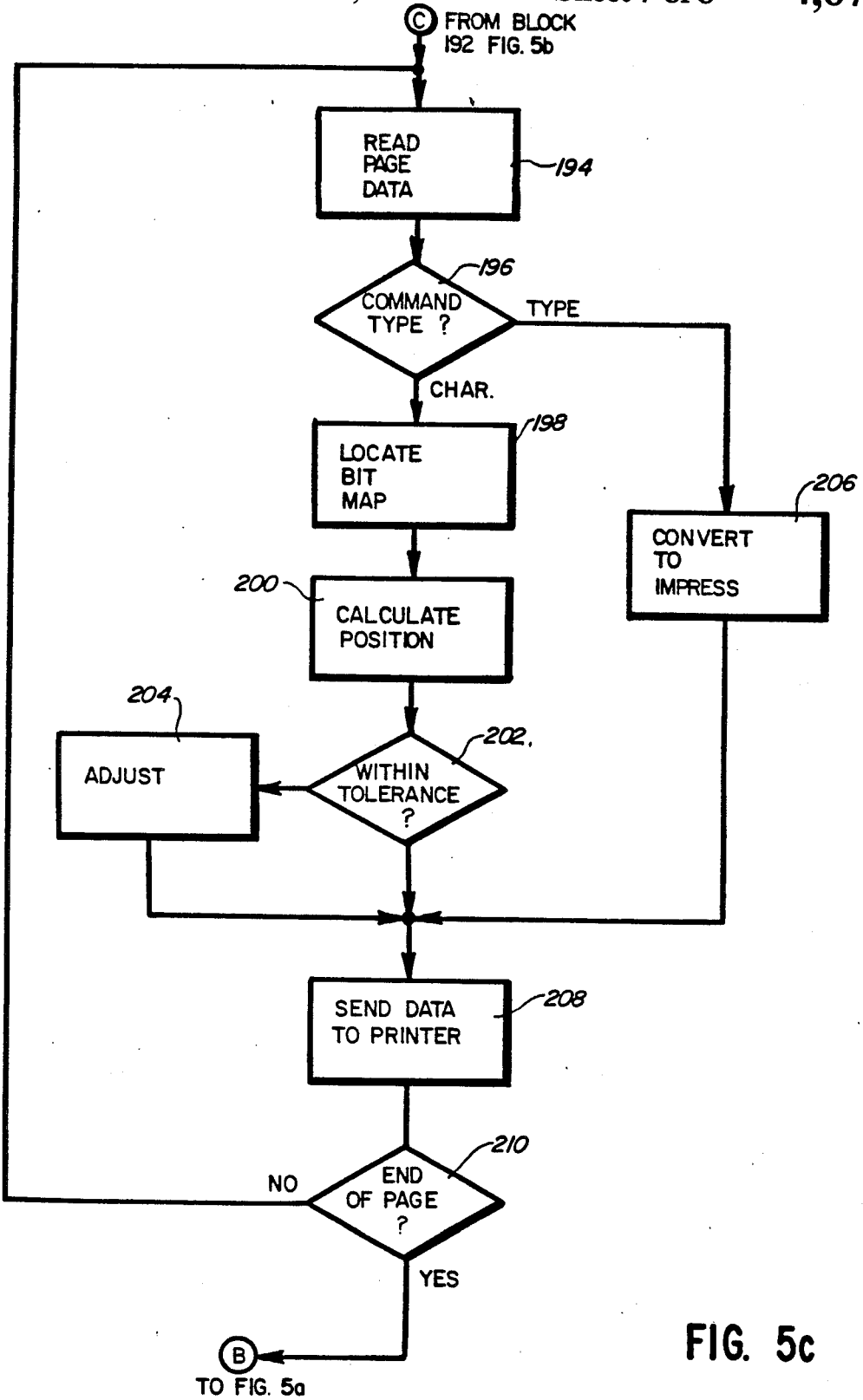

FIGS. 5a and 5b illustrate in greater detail the dequeue routine performed by the main processor 32.

Referring specifically to FIG. 5a, following the block 100, FIG. 3, a block 160 reads the header block of the composition data currently stored on the priority queue having the highest priority and stores same in the RAM 34. A block 164 then analyzes this header block and determines whether the data associated with the header block comprises font data or page data.

If the data is font data, a temporary working file is created on the disk storage device 38 and the font data is stored in the temporary file by a block 168. A block 170 converts the font data to the common internal format noted above and stores the converted data in a data file. If an error is detected during the conversion by a block 172, the data file is deleted and control passes to a block 176. However, if no error is detected, control passes directly to the block 176. Following either of the blocks 172 or 174, the data read from the priority queue is then deleted therefrom by a block 176. Control then returns to the block 100, FIG. 3.

If the data on the priority queue is determined by the block 164 to be page data, control passes to a block 178 which checks a flag to determine whether the image processor 24 has sufficient storage to store the additional glyphs required for the next page.

As indicated above, the glyph directories maintain a list of all glyphs presently stored in the image processor 24. To increase the operating speed of the system, the glyphs stored in the image processor 24 are not regularly erased upon completion of each page; rather the glyphs remain stored in the image processor 24 so as to be available if required on a later page. However, eventually the storage limits of the image processor 24 are approached.

In order to minimize the possibility of an overflow of the memory in the image processor 24, the dequeue routine monitors the amount of memory presently being utilized. If the memory utilized exceeds a predetermined amount (referred to as a "safe limit", the flag referred to above is set. This predetermined amount is based upon an estimate of how many additional glyphs not currently stored in the image processor 24 will be required to complete the next page.

If the flag checked by the block 178 is set, the image processor 24 and the glyph directories are reinitialized by a block 179.

If the block 178 determines that the glyph directory safe limit has not been exceeded, a block 180 determines whether the paper size for the proof and the number of copies of the proof for the current page, as indicated in the header block, are the same as for the previous page. If these proof parameters are the same, the data stored in the image processor 24 representing these proof parameters need not be modified. However, if these proof parameters are different from that which is currently stored in the image processor 24, the data stored therein must be updated.

Due to the nature of the image processor 24, it must be reinitialized by the block 179 in order to change any data stored therein.

Referring now to FIG. 5b, there is illustrated the prepage and postpage sub-routines of the dequeue routine.

The function of the prepage sub-routine generally is to read the page data on the priority queue, to determine those additional glyphs required beyond those already stored in the image processor 24 and to store in the image processor 24 encoded representations of those additional glyphs.

A glyph includes both printed areas and nonprinted areas. Each glyph is encoded in the memory of the image processor 24 as a bit-map. A bit-map is a series of memory locations, each of which represents a pixel, and which together define the printed and nonprinted areas of a glyph.

As shown specifically in FIG. 5b, a block 181 reads the header block of the page data to determine the format in which the page data is encoded so that the preprocessor can correctly interpret the commands therein. A block 182 then reads the first character command in that section of the data previously comprising page data block B. A block 184 compares the character command to the contents of the glyph directory to determine whether the corresponding bit-map is currently stored in the image processor 24.

If a bit-map corresponding to the character command is not currently stored therein, a block 185 accesses the font data which is currently resident on the disk storage device 38 as formatted in the common internal format and writes that portion of the font data into the RAM 34 corresponding to the character command for which a bit-map is to be created.

A block 186, discussed in greater detail below in conjunction with FIG. 6, creates a bit map for the glyph and a block 188 stores the newly created bit-map in the image processor 24. A block 190 then updates the glyph directories.

Once a bit-map has been created for the glyph and stored in the image processor 24, a block 192 determines whether the character command is the last character command for the page. If not, the block 180 then reads the next character command.

If the character command is the last character command for the page, the prepage sub-routine ends and the postpage sub-routine begins.

A block 194 reads the first command of the page data section previously comprising page data block B. A block 196 determines whether the command is a character command or a typesetting command. If the command is a character command, a block 198 locates in the image processor 24 the corresponding bit-map which was stored therein during the previous prepage sub-routine.

It should be noted that the bit-maps are defined by lower resolution data than are the characters as defined in the page data. This difference in resolution leads to round-off errors which result due to the difference between the "true" set-width, as defined in the page data in which units of measure commonly referred to as "points" (or approximately 1/72nd of an inch) and the "calculated" glyph set-width as defined by the bit-map in units of measure commonly referred to as pixels (the size of which is dependent upon the resolution of the output device). Unless compensated, these errors will accumulate causing incorrect positioning of the glyphs on the proof.

To eliminate this problem, a block 200 calculates the current position of the glyph both in points (and fractions thereof), indicating the "true" position, and in pixels, indicating the "calculated" position and stores this information.

A block 202 determines whether the difference between the "true" position and the "calculated" position exceeds one pixel. If the difference does exceed one pixel, the "calculated" position is adjusted accordingly to minimize the error, and sent to the image processor 24.

The adjusted bit map is then transferred by a block 208 to the laser printer and the glyph is printed on the paper.

Referring again to block 196, if it is determined that the command is a typesetting command, the typesetting command is converted by a block 206 to Impress format, which is the format compatible with the Imagen image processor. Of course, if a different image processor is used, the typesetting command may be converted to a different format.

The block 208 then sends the converted typesetting commands to the image processor 24. A block 210 determines whether the end of the page has been reached. If not, the block 194 reads the next command of the page data.

However, if the end of the page has been reached, the block 176, FIG. 5a, removes the now completed job from the queue, and control returns to the block 100.

Figure 6:
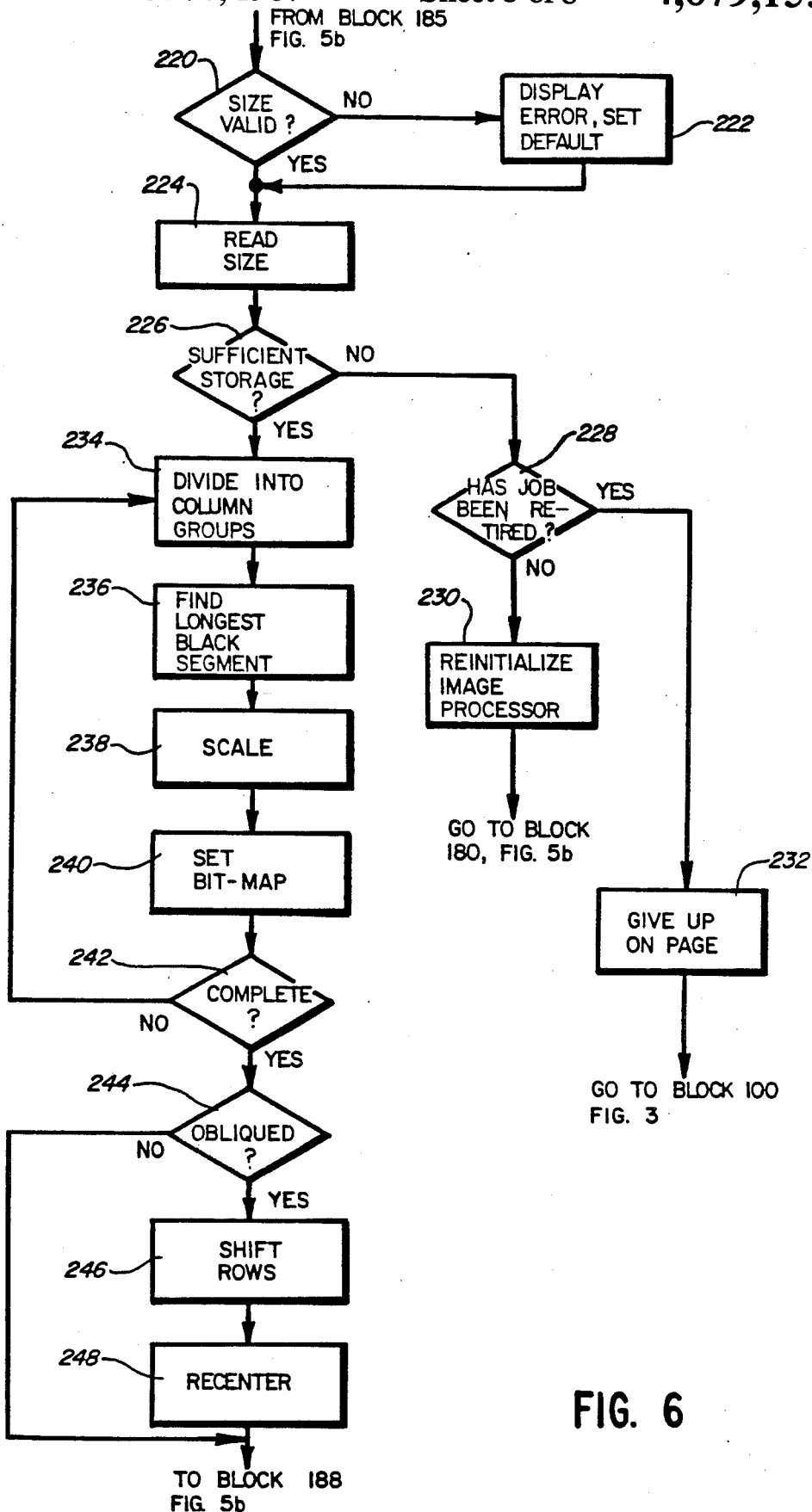
FIG. 6 is a flow chart illustrating the routine for scaling and creating bit maps shown in general form as block 186, FIG. 5b.

Referring now to FIG. 6, there is illustrated in greater detail the block 186, shown in FIG. 5b.

A block 220 receives character commands corresponding to glyphs not currently stored in the image processor 24.

If the character command contains unacceptable size information, an error message is generated. In addition, the dimension of the glyph is set to a default value.

If the character command received is valid, a block 224 determines the size of the glyph. A block 226 then reads the first glyph directory to determine whether the image processor 24 contains sufficient storage space to store the bit-map representing the additional glyph. If the image processor 24 does not contain sufficient space, the image processor 24 is reinitialized and the page job is then retried. If the page has already been retried, indicating that the page job contains more glyphs than can be stored in the image processor 24, the page job is abandoned and control returns to block 100, FIG. 3.

The character command at this point includes data which can only be utilized by a high resolution output device. The character command data must first be converted to a form usable with low resolution output devices prior to creating the bit-maps to be stored in the image processor 24. This is accomplished by creating a single character column representative of a plurality of original character columns. The ratio of single character columns to original character columns is determined by the ratio of high resolution to low resolution.

A block 234 divides the character defined by the original character command data into groups of columns. A block 236 determines the column within the first group which has the longest black segment, wherein a black segment is that continuous portion of a column in which printing will occur in the final proof.

The column within the first group containing the longest black segment will be utilized as the single character column representative of the first group.

A block 238 scales the length of the black segment to that required for the final dimension of the glyph to be printed and a block 240 creates the bit map data according to the commanded rotation of the character.

A block 242 determines whether the glyph is now complete. If not, the next group of original character columns are converted to a single character column representative thereof.

A block 244 determines whether the glyph is to be printed in an oblique fashion. If so, a block 246 shifts each row of the bit map to the right by an amount dependent upon its proximity to the top row. Rows closest to the top are shifted to the right the greatest amount while the rows near the bottom of the glyph are shifted little if at all. A block 248 then recenters the bit-map by shifting the entire glyph to the left.

Following the block 248, control continues to block 188, FIG. 5b.

We claim:

1. A methed of emulating a variety of typesetters to produce an image on a reproduction medium utilizing page data and font data, wherein at least one of the page data and the font data is encoded in any of a plurality of formats, such data including an identification of the particular format in which the data is encoded, comprising the steps of:
processing the font data and page data in accordance with the identification to derive an encoded representation of the glyph to be reproduced and to derive character and typesetting commands which together define the placement of the glyph on the reproduction medium; and
controlling an output device to create the image on the reproduction medium in accordance with the encoded glyph representation and the character and the typesetting commands.

2. The method of claim 1, wherein the step of processing includes the step of converting the font data into a particular format.

3. The method of claim 1, wherein the output device is controlled by an image processor and wherein the step of processing includes the step of converting the typesetting commands into a language recognizable by the image processor.

4. The method of claim 1, wherein the step of processing includes the step of creating a bit-map of the glyph to be reproduced.

5. The method of claim 4, wherein the output device is controlled by an image processor and wherein the step of processing includes the further step of storing the bit-map in a memory within the image processor.

6. The method of claim 5, wherein the image processor is controlled by a preprocessor, and wherein the step of processing includes the further step of maintaining in the preprocessor a directory of the glyphs for which bit-maps have been created 7. The method of claim 6, wherein the step of processing includes the further step of determining from the directory whether there is sufficient memory in the image processor to store a bit-map created for a glyph.

8. The method of claim 4, wherein the step of creating the bit-map includes the step of scaling to the required size of the glyph.

9. The method of claim 4, wherein the step of creating the bit-map includes the step of rotating the glyph.

10. The method of claim 4, wherein the step of creating the bit-map includes the step of adjusting the obliquity of the glyph.

11. The method of claim 1, wherein the output device is capable of creating a proof at a resolution different than the resolution of the page and font data and wherein the step of processing includes the step of correcting for errors due to the inability of the output device to position the glyph with the accuracy specified by the character and typesetting commands.

12. The method of claim 11, wherein a plurality of glyphs are to be reproduced and wherein the correcting step includes the steps of determining the position where a particular glyph would be reproduced on the reproduction medium if no correction were undertaken, calculating the position where the glyph should be reproduced and shifting the position at which the glyph is actually reproduced to minimize the difference between the calculated and determined positions.

13. The method of claim 11, wherein the output device is capable of creating a proof at a resolution lower than the resolution of the page and font data.

14. A method of creating a proof which comprises at least one glyph reproduced on a reproduction medium from page and font data encoded in any of a plurality of formats, such data including an identification of the particular format in which the data is encoded, comprising the steps of:
processing the font data and page data a first time in accordance with the identification to derive an encoded representation of the glyph to be reproduced;

processing the page data a second time in accordance with the identification to derive character and typesetting commands which together define the placement of the glyph on the reproduction medium; and controlling an output device to create the proof on the reproduction medium in accordance with the encoded glyph representation and the character and the typesetting commands.

15. The method of claim 14, wherein the step of processing the first time includes the step of converting the font data into a particular format.

16. The method of claim 14, wherein the output device is controlled by an image processor and wherein the step of processing the second time includes the step of converting the typesetting commands into a language recognizable by the image processor.

17. The method of claim 14, wherein the step of processing the first time includes the step of creating a bit-map of the glyph to be reproduced.

18. The method of claim 17, wherein the output device is controlled by an image processor and wherein the step of processing the first time includes the further step of storing the bit-map in a memory within the image processor.

19. The method of claim 18, wherein the image processor is controlled by a preprocessor, and wherein the step of processing the first time includes the further step of maintaining in the preprocessor a directory of the glyphs for which bit-maps have been created.

20. The method of claim 19, wherein the step of processing the first time includes the further step of determining from the directory whether there is sufficient memory in the image processor to store a bit-map created for a glyph.

21. The method of claim 17, wherein the step of creating the bit-map includes the step of scaling to the required size of the glyph.

22. The method of claim 17, wherein the step of creating the bit-map includes the step of rotating the glyph.

23. The method of claim 17, wherein the step of creating the bit-map includes the step of adjusting the obliquity of the glyph.

24. The method of claim 14, wherein the output device is capable of creating a proof at a resolution different than the resolution of the page and font data and wherein the step of processing includes the step of correcting for errors due to the inability of the output device to position the glyph with the accuracy specified by the character and typesetting commands.

25. The method of claim 24, wherein a plurality of glyphs are to be reproduced and wherein the correcting step includes the steps of determining the position where a particular glyph would be reproduced on the reproduction medium if no correction were undertaken, calculating the position where the glyph should be reproduced and shifting the position at which the glyph is actually reproduced to minimize the difference between the calculated and determined positions.

26. The method of claim 24, wherein the output device is capable of creating a proof at a resolution lower than the resolution of the page and font data.

27. A phototypesetter emulator capable of emulating a plurality of phototypesetters to create a proof comprising glyphs reproduced on a reproduction medium from page and font data including an identification of the particular phototypesetter to be emulated, comprising:

a preprocessor including means responsive to the identification, the page data and the converted font data for creating bit-maps of the glyphs to be reproduced and means responsive to the identification and to the page data for deriving character and typesetting commands from the page data which together define the placement of glyphs on the proof;

an image processor coupled to the preprocessor including means for storing the bit-maps therein; and an output device coupled to the image processor and controlled thereby in accordance with the character and typesetting commands and the bit-maps to create the proof.

28. In a system for causing an output device to print a glyph in response to composition data specifying a character in a first resolution, wherein the composition data defines the character as a series of black and white segments disposed in adjacent columns and the output device is responsive to data defining the glyph in a second, lower resolution, a method of operating the output device with data defining the glyph in the second resolution in accordance with the composition data, comprising the steps of:

creating groups of columns, each group having a number of columns defined in the first resolution;

determining for each group the column having the longest black segment; and utilizing the column having the longest black segment to define the column in the second resolution to represent the group 29. The system of claim 28 wherein the number of columns per group is determined by the ratio of the first resolution to the second resolution 30. In a system for creating a proof from composition data, wherein the proof comprises at least two pages having at least one glyph reproduced on a reproduction medium, the system having a preprocessor for creating glyph data in response to character commands included in the composition data, an image processor for storing the glyph data for each page, and an output device responsive to the stored glyph data for creating glyphs, a method of minimizing redundant creation of glyph data, comprising the steps of:

creating glyph data for a first page;

storing the glyph data for the first page in the image processor;

preselecting a safe limit representing an estimate of how many additional glyphs not presently stored in the image processor will be required to complete the next page;

determining, upon completion of each page, whether the safe limit has been exceeded; and reinitializing the image processor if the safe limit has been exceeded and subsequently storing the glyph data for the next page in the image processor.

31. The method of claim 30, wherein the safe limit is compared to a glyph directory maintained in the preprocessor which indicates the current storage availability of the image processor to determine whether the safe limit is exceeded.

* * * * *